United States Patent
Koenig et al.

(10) Patent No.: US 10,402,405 B2
(45) Date of Patent: Sep. 3, 2019

(54) EXPLICIT DECLARATION OF ASSOCIATIONS TO OPTIMIZE GROUPING OF ELEMENTS BY LARGE DATA OBJECTS

(71) Applicant: SAP SE, Walldorf (DE)

(72) Inventors: Edgardo Gildo Koenig, Leimen (DE);
Steffen Siegmund, St. Leon-Rot (DE);
Guenter Briam, Wiesloch (DE); Arndt Effern, Sinsheim-Duehren (DE)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 15/479,479

(22) Filed: Apr. 5, 2017

(65) Prior Publication Data
US 2018/0293277 A1    Oct. 11, 2018

(51) Int. Cl.
*G06F 16/2453*    (2019.01)
(52) U.S. Cl.
CPC .... *G06F 16/24544* (2019.01); *G06F 16/2454* (2019.01)
(58) Field of Classification Search
CPC ......... G06F 17/24544; G06F 16/24544; G06F 16/2454
See application file for complete search history.

(56) References Cited

U.S. PATENT DOCUMENTS

| | | | |
|---|---|---|---|
| 6,775,676 B1 | 8/2004 | Briam et al. | |
| 7,461,097 B2 | 12/2008 | Stahl et al. | |
| 7,774,318 B2 | 8/2010 | Effern | |
| 8,886,596 B2 | 11/2014 | Effern et al. | |
| 9,207,998 B2 | 12/2015 | Rapp et al. | |
| 2004/0122865 A1 | 6/2004 | Stahl | |
| 2009/0024570 A1* | 1/2009 | Yoaz | G06F 16/24547 |
| 2009/0024593 A1* | 1/2009 | Allen | G06F 16/2428 |
| 2010/0299327 A1* | 11/2010 | Kiefer | G06F 16/8358 |
| | | | 707/736 |
| 2013/0007000 A1* | 1/2013 | Indeck | G06F 16/353 |
| | | | 707/741 |

OTHER PUBLICATIONS

GROUP BY on Blob / dBforums; visited Webpage on Oct. 26, 2016 <http://www.dbforums.com/showthread.php?1671934-GROUP-BY-on-blob> 6 pages.
U.S. Appl. No. 15/086,733, filed Mar. 31, 2016, Koenig et al.

* cited by examiner

*Primary Examiner* — Jensen Hu
(74) *Attorney, Agent, or Firm* — Fish & Richardson P.C.

(57) ABSTRACT

The disclosure generally describes methods, software, and systems, including a method for optimizing queries referencing large object (LOB) information. A structured query language (SQL) query containing an LOB field is identified. LOB replacement information for the LOB field is obtained from a data model. The SQL query is optimized including substituting, using the obtained LOB replacement information, the LOB field with replacement language to create an updated SQL query, and extending the updated SQL query with a join of LOB field language to create an extended SQL query.

17 Claims, 14 Drawing Sheets

200

SELECT
202 — /* RDS_SOURCE := DO_PROVIDER_SOURCE_BRIDGE */
→ DATAPROV.STATEMENT_STRING AS STATEMENT_STRING
,DATAPROV.IS_EXPENSIVE AS IS_EXPENSIVE
,DATAPROV.TOTAL_EXECUTION_TIME AS TOTAL_EXECUTION_TIME
FROM
(
/* RDS_SOURCE := A$HLP_OPTIMIZATION_J1 */
/* RDS_SOURCE := SQ_SOURCE_AGGR */
SELECT
202 — /* RDS_SOURCE := SQ_EXC_AGGR */ SQ_STD_AGGR.IS_EXPENSIVE AS IS_EXPENSIVE
→ ,SQ_STD_AGGR.STATEMENT_STRING AS STATEMENT_STRING
,SUM( SQ_STD_AGGR.TOTAL_EXECUTION_TIME ) AS TOTAL_EXECUTION_TIME
FROM
(
SELECT
/* RDS_SOURCE := SQ_STD_AGGR */
SQ_SOURCE.IS_EXPENSIVE AS IS_EXPENSIVE
202 — ,SQ_SOURCE.SERVER_TIMESTAMP AS SERVER_TIMESTAMP
→ ,SQ_SOURCE.STATEMENT_STRING AS STATEMENT_STRING
,SUM( SQ_SOURCE.TOTAL_EXECUTION_TIME ) AS TOTAL_EXECUTION_TIME
FROM
(
SELECT
/* RDS_SOURCE := HLP_OPTIMIZATION_J1 */
CASE WHEN IFNULL (T2.STATEMENT_STRING, 'NULL') != 'NULL' THEN 'TRUE'
 ELSE 'FALSE' END AS IS_EXPENSIVE
202 — ,T1.SERVER_TIMESTAMP AS SERVER_TIMESTAMP
→ ,T1.STATEMENT_STRING AS STATEMENT_STRING
,T1.TOTAL_EXECUTION_TIME AS TOTAL_EXECUTION_TIME
FROM
*Continued on FIG. 2B*

Continued from FIG. 2A
(
SELECT
  /* RDS_SOURCE := TH_HOST_SQL_PLAN_CACHE */
  T.HOST AS HOST
  ,T.PORT AS PORT
  ,T.SERVER_TIMESTAMP AS SERVER_TIMESTAMP
202 → ,T.STATEMENT_STRING AS STATEMENT_STRING
  ,T.TOTAL_EXECUTION_TIME AS TOTAL_EXECUTION_TIME
FROM
  _SYS_STATISTICS.HOST_SQL_PLAN_CACHE AS T
    /* RDS_SOURCE := TH_HOST_SQL_PLAN_CACHE */
WHERE
  ( T.SERVER_TIMESTAMP >= CAST( '2015-12-01 14:31:00' AS TIMESTAMP )
  AND T.SERVER_TIMESTAMP < CAST( '2015-12-02 14:31:31' AS TIMESTAMP ) )) AS T1
/* RDS_SOURCE := TH_HOST_SQL_PLAN_CACHE */
LEFT OUTER JOIN
(
SELECT
  /* RDS_SOURCE := A$TH_EXPENSIVE_STATEMENTS */
  AGGR_ACCESS.HOST AS HOST
  ,AGGR_ACCESS.PORT AS PORT
202 → ,AGGR_ACCESS.START_TIME AS START_TIME
  ,AGGR_ACCESS.STATEMENT_STRING AS STATEMENT_STRING
FROM
  (
  /* RDS_SOURCE := SQ_SOURCE_WTS_AGGR_001 */
  /* RDS_SOURCE := SQ_STD_AGGR_000 */
  SELECT
    /* RDS_SOURCE := TH_EXPENSIVE_STATEMENTS */
    T.HOST AS HOST
    ,T.PORT AS PORT
202 → ,T.START_TIME AS START_TIME
  ,T.STATEMENT_STRING AS STATEMENT_STRING
FROM
Continued on FIG. 2C

FIG. 2B

_Continued from FIG. 2B_

SYS.M_EXPENSIVE_STATEMENTS AS T /* RDS_SOURCE :=
TH_EXPENSIVE_STATEMENTS

WHERE

WHERE ( T.SERVER_TIMESTAMP >= CAST( '2015-12-01 14:31:00' AS TIMESTAMP ) AND
   T.SERVER_TIMESTAMP < CAST( '2015-12-02 14:31:31' AS TIMESTAMP ) )

/* RDS_SOURCE := A$TH_EXPENSIVE_STATEMENTS */

GROUP BY

AGGR_ACCESS.HOST

,AGGR_ACCESS.PORT

,AGGR_ACCESS.START_TIME

,AGGR_ACCESS.STATEMENT_STRING

) AS T2 /* RDS_SOURCE := A$TH_EXPENSIVE_STATEMENTS */

ON ( T1.HOST = T2.HOST AND T1.PORT = T2.PORT AND
   T1.STATEMENT_STRING = T2.STATEMENT_STRING )

) AS SQ_SOURCE /* RDS_SOURCE := SQ_STD_AGGR */

GROUP BY

SQ_SOURCE.IS_EXPENSIVE

,SQ_SOURCE.SERVER_TIMESTAMP

,SQ_SOURCE.STATEMENT_STRING

) AS SQ_STD_AGGR /* RDS_SOURCE := SQ_EXC_AGGR */

GROUP BY

SQ_STD_AGGR.IS_EXPENSIVE

,SQ_STD_AGGR.STATEMENT_STRING

) AS DATAPROV /* RDS_SOURCE := DO_PROVIDER_SOURCE_BRIDGE */

SELECT
302 — /* RDS_SOURCE := DO_PROVIDER_SOURCE_BRIDGE */
↳ DATAPROV.STATEMENT_STRING AS STATEMENT_STRING
,DATAPROV.IS_EXPENSIVE AS IS_EXPENSIVE
,DATAPROV.TOTAL_EXECUTION_TIME AS TOTAL_EXECUTION_TIME
FROM
(
SELECT
/* RDS_SOURCE := LOB_ACCESS */
AGGR_ACCESS.IS_EXPENSIVE AS IS_EXPENSIVE
302 — ↳ ,PLAIN_LOB_ACCESS_001.STATEMENT_STRING AS STATEMENT_STRING
,AGGR_ACCESS.TOTAL_EXECUTION_TIME AS TOTAL_EXECUTION_TIME
FROM
(
/* RDS_SOURCE := A$HLP_OPTIMIZATION_J1 */
/* RDS_SOURCE := SQ_SOURCE_AGGR */
SELECT
/* RDS_SOURCE := SQ_EXC_AGGR */
SQ_STD_AGGR.IS_EXPENSIVE AS IS_EXPENSIVE
302 — ↳ ,SQ_STD_AGGR.STATEMENT_HASH AS STATEMENT_HASH
,SUM( SQ_STD_AGGR.TOTAL_EXECUTION_TIME ) AS TOTAL_EXECUTION_TIME
FROM
(
SELECT
/* RDS_SOURCE := SQ_STD_AGGR */
SQ_SOURCE.IS_EXPENSIVE AS IS_EXPENSIVE
,SQ_SOURCE.SERVER_TIMESTAMP AS SERVER_TIMESTAMP
302 — ↳ ,SQ_SOURCE.STATEMENT_HASH AS STATEMENT_HASH
,SUM( SQ_SOURCE.TOTAL_EXECUTION_TIME ) AS TOTAL_EXECUTION_TIME
FROM
(
SELECT
*Continued on FIG. 3B*

FIG. 3A

*Continued from FIG. 3A*
```
/* RDS_SOURCE := HLP_OPTIMIZATION_J1 */
CASE WHEN IFNULL (T2.STATEMENT_HASH, 'NULL') != 'NULL'
     THEN 'TRUE' ELSE 'FALSE' END AS IS_EXPENSIVE
  ,T1.SERVER_TIMESTAMP AS SERVER_TIMESTAMP
  ,T1.STATEMENT_HASH AS STATEMENT_HASH
  ,T1.TOTAL_EXECUTION_TIME AS TOTAL_EXECUTION_TIME
FROM
  (
  SELECT
    /* RDS_SOURCE := TH_HOST_SQL_PLAN_CACHE */
     T.HOST AS HOST
    ,T.PORT AS PORT
    ,T.SERVER_TIMESTAMP AS SERVER_TIMESTAMP
    ,T.STATEMENT_HASH AS STATEMENT_HASH
    ,T.TOTAL_EXECUTION_TIME AS TOTAL_EXECUTION_TIME
  FROM
    _SYS_STATISTICS.HOST_SQL_PLAN_CACHE AS T /* RDS_SOURCE :=
        TH_HOST_SQL_PLAN_CACHE */
  WHERE
    ( T.SERVER_TIMESTAMP >= CAST( '2015-12-01 14:31:00' AS TIMESTAMP ) AND
      T.SERVER_TIMESTAMP < CAST( '2015-12-02 14:31:31' AS TIMESTAMP ) )
  ) AS T1 /* RDS_SOURCE := TH_HOST_SQL_PLAN_CACHE */
  LEFT OUTER JOIN
  (
  SELECT
    /* RDS_SOURCE := A$TH_EXPENSIVE_STATEMENTS */
     AGGR_ACCESS.HOST AS HOST
    ,AGGR_ACCESS.PORT AS PORT
    ,AGGR_ACCESS.START_TIME AS START_TIME
    ,AGGR_ACCESS.STATEMENT_HASH AS STATEMENT_HASH
  FROM
    (
    /* RDS_SOURCE := SQ_SOURCE_WTS_AGGR_001 */
    /* RDS_SOURCE := SQ_STD_AGGR_000 */
    SELECT
```
*Continued on FIG. 3C*

FIG. 3B

*Continued from FIG. 3B*
```
        /* RDS_SOURCE := TH_EXPENSIVE_STATEMENTS */
        T.HOST AS HOST
        ,T.PORT AS PORT
302     ,T.START_TIME AS START_TIME
        ,T.STATEMENT_HASH AS STATEMENT_HASH
      FROM
        SYS.M_EXPENSIVE_STATEMENTS AS T
          /* RDS_SOURCE := TH_EXPENSIVE_STATEMENTS */
      WHERE
        ( T.START_TIME >= CAST( '2015-12-01 14:31:00' AS TIMESTAMP ) AND
          T.START_TIME < CAST( '2015-12-02 14:31:31' AS TIMESTAMP ) )
      ) AS AGGR_ACCESS /* RDS_SOURCE := A$TH_EXPENSIVE_STATEMENTS */
      GROUP BY
        AGGR_ACCESS.HOST
        ,AGGR_ACCESS.PORT
302     ,AGGR_ACCESS.START_TIME
        ,AGGR_ACCESS.STATEMENT_HASH
      ) AS T2 /* RDS_SOURCE := A$TH_EXPENSIVE_STATEMENTS */
      ON ( T1.HOST = T2.HOST AND T1.PORT = T2.PORT AND T1.STATEMENT_HASH =
           T2.STATEMENT_HASH )
    ) AS SQ_SOURCE /* RDS_SOURCE := SQ_STD_AGGR */
  GROUP BY
    SQ_SOURCE.IS_EXPENSIVE
    ,SQ_SOURCE.SERVER_TIMESTAMP
    ,SQ_SOURCE.STATEMENT_HASH
  ) AS SQ_STD_AGGR /* RDS_SOURCE := SQ_EXC_AGGR */
GROUP BY
  SQ_STD_AGGR.IS_EXPENSIVE
  ,SQ_STD_AGGR.STATEMENT_HASH
) AS AGGR_ACCESS /* RDS_SOURCE := A$HLP_OPTIMIZATION_J1 */
```
*Continued on FIG. 3D*

FIG. 3C

*Continued from FIG. 3C*

```
INNER JOIN
(
SELECT
  /* RDS_SOURCE := HLP_OPTIMIZATION_V2 */
  HLP_OPTIMIZATION_V2.STATEMENT_HASH AS STATEMENT_HASH
  ,HLP_OPTIMIZATION_V2.STATEMENT_STRING AS STATEMENT_STRING
FROM
(
SELECT
  /* RDS_SOURCE := HLP_STMT_OBJ_V1 */
  ROW_NUMBER( ) OVER ( PARTITION BY HLP_STMT_OBJ_V1.STATEMENT_HASH )
      AS SH_DO_ROW_NUMBER
  ,HLP_STMT_OBJ_V1.STATEMENT_HASH AS STATEMENT_HASH
  ,HLP_STMT_OBJ_V1.STATEMENT_STRING AS STATEMENT_STRING
FROM
(
/* RDS_SOURCE := H_SQL_PLAN_CACHE_AGGR */
SELECT
  /* RDS_SOURCE := TH_HOST_SQL_PLAN_CACHE */
  T.STATEMENT_HASH AS STATEMENT_HASH
  ,T.STATEMENT_STRING AS STATEMENT_STRING
FROM
  _SYS_STATISTICS.HOST_SQL_PLAN_CACHE AS T
      /*RDS_SOURCE := TH_HOST_SQL_PLAN_CACHE */
) AS HLP_STMT_OBJ_V1 /* RDS_SOURCE := HLP_STMT_OBJ_V1 */
) AS HLP_OPTIMIZATION_V2 /* RDS_SOURCE := HLP_OPTIMIZATION_V2 */
WHERE
HLP_OPTIMIZATION_V2.SH_DO_ROW_NUMBER = 1
) AS PLAIN_LOB_ACCESS_001 /* RDS_SOURCE := HLP_OPTIMIZATION_V2 */
ON ( AGGR_ACCESS.STATEMENT_HASH = PLAIN_LOB_ACCESS_001.STATEMENT_HASH )
) AS DATAPROV /* RDS_SOURCE := DO_PROVIDER_SOURCE_BRIDGE */
```

402 {
```
*Create a virtual data source that describes an association between STATEMENT_STRING and
    STATEMENT_HASH
lo_rds_virtual = me->mo_rds_processor->add_source_virtual(
  iv_id    = 'HLP_OPTIMIZATION_V1'
  iv_alias = 'HLP_OPTIMIZATION_V1'
  iv_label = 'HLP_OPTIMIZATION_V1' ).

lo_rds_virtual->add_source_plain(
  iv_source_name = cl_do_cr_db_hdb_constants=>e_rds_source_h-h_sql_plan_cache_aggr ).

lo_rds_virtual->use_field( 'STATEMENT_HASH' ).
lo_rds_virtual->use_field( 'STATEMENT_STRING' ).

lo_rds_virtual->add_characteristic(
  iv_id           = 'SH_DO_ROW_NUMBER'
  iv_db_type      = 'INTEGER'
  iv_expression= `ROW_NUMBER( ) OVER
       ( PARTITION BY HLP_OPTIMIZATION_V1.STATEMENT_HASH )`
  iv_dependencies = `HLP_OPTIMIZATION_V1.STATEMENT_HASH`
  iv_label        = 'Row Number' ).
```
_Continued on FIG. 4B_

*Continued from FIG. 4A*

```
*Create a further virtual data source that ensures that only one record is retrieved per hash value
lo_rds_virtual = me->mo_rds_processor->add_source_virtual(
   iv_id    = 'HLP_OPTIMIZATION_V2'
   iv_label = `HLP_OPTIMIZATION_V2`
   iv_alias = `HLP_OPTIMIZATION_V2` ).

lo_rds_virtual->add_source_plain(
   iv_source_name = cl_do_cr_db_hdb_constants=>e_rds_source_hlp-hlp_stmt_obj_v1 ).
lo_rds_virtual->add_characteristic(
   iv_id       = 'STATEMENT_STRING'
   iv_db_type  = 'CLOB'
   iv_label    = 'Statement String'
   iv_expression  = `HLP_OPTIMIZATION_V2.STATEMENT_STRING`
   iv_dependencies = `HLP_OPTIMIZATION_V2.STATEMENT_STRING` ).
" HASH for LOB-like field lo_rds_virtual->add_characteristic(
   iv_id       = 'STATEMENT_HASH'
   iv_db_type  = 'VARCHAR(32)'
   iv_label    = 'Statement Hash'
   iv_expression  = `HLP_OPTIMIZATION_V2.STATEMENT_HASH`
   iv_dependencies = `HLP_OPTIMIZATION_V2.STATEMENT_HASH ` ).

lo_rds_virtual->if_do_cdl_rds_source~add_option(
   iv_option_id    = `DEFAULT_CONDITION_RUNTIME`
   iv_option_value = `HLP_OPTIMIZATION_V2.SH_DO_ROW_NUMBER = 1`).
```

*Continued from FIG. 4B*
```
* Create actual data model
lo_rds_join = me->mo_rds_processor->add_source_ansijoin(
   iv_id    = 'HLP_OPTIMIZATION_J1'
   iv_label = 'HLP_OPTIMIZATION_J1' ).

lo_rds_join->add_source_plain(
   iv_source_name = cl_do_cr_db_hdb_constants=>e_rds_source_th-th_host_sql_plan_cache
   iv_alias       = 'T1' ).

lo_rds_join->add_source_aggr(
   iv_source_name = cl_do_cr_db_hdb_constants=>e_rds_source_th-th_expensive_statements
   iv_alias       = 'T2' ).

lo_rds_join->add_join_condition(
   iv_order       = 1
   iv_kind        = 'LEFT OUTER JOIN'
   iv_left_alias  = 'T1'
   iv_right_alias = 'T2'
   iv_condition   = 'T1.HOST = T2.HOST AND T1.PORT = T2.PORT AND
                     T1.STATEMENT_HASH = T2.STATEMENT_HASH'
   iv_dependencies = 'T1.HOST,T2.HOST,T1.PORT,T2.PORT,T1.STATEMENT_HASH,
                     T2.STATEMENT_HASH' ).

lo_rds_join->add_equivalence(
   iv_id = 'SERVER_TIMESTAMP'
   v_equivalences = 'T1.SERVER_TIMESTAMP,T2.START_TIME' ).

lo_rds_join->add_time(
   iv_id         = 'SERVER_TIMESTAMP'
   iv_db_type    = 'TIMESTAMP'
   iv_label      = 'Server Timestamp'
   iv_expression = 'T1.SERVER_TIMESTAMP'
   iv_dependencies = 'T1.SERVER_TIMESTAMP' ).

lo_rds_join->use_field(
   iv_id    = 'HOST'
   iv_alias = 'T1' ).

lo_rds_join->use_field(
   iv_id    = 'PORT'
   iv_alias = 'T1' ).

lo_rds_join->use_field(
   iv_id    = 'PLAN_ID'
   iv_alias = 'T1' ).

lo_rds_join->use_field(
   iv_id    = 'STATEMENT_HASH'
   iv_alias = 'T1' ).
```
*Continued on FIG. 4D*

*Continued from FIG. 4C*

406 {
*Anchor the association between STATEMENT_TEXT and STATEMENT_HASH for grouping
lo_rds_groupby_expr = me->mo_rds_processor->get_groupby_expr_instance( ).
lo_rds_groupby_expr->set_datasource( 'HLP_OPTIMIZATION_V2' ).
lo_rds_groupby_expr->add_field_substitute( `STATEMENT_HASH` ).
lo_rds_groupby_expr->add_field_mapping( iv_outer_field_id = `STATEMENT_HASH`
                              iv_inner_field_id = `STATEMENT_HASH`       ).
lo_rds_groupby_expr->add_field_mapping( iv_outer_field_id = `STATEMENT_STRING`
                              iv_inner_field_id = `STATEMENT_STRING` ).

lo_rds_join->add_characteristic(
  iv_id = 'STATEMENT_STRING'
  iv_expression = 'T1.STATEMENT_STRING'
  iv_dependencies = 'T1.STATEMENT_STRING'
  iv_db_type      = 'CLOB'
  iv_label        = 'Statement String'
  iv_groupby_field_id = lo_rds_groupby_expr->as_string( ) ).

lo_rds_join->add_characteristic(
  iv_id = 'IS_EXPENSIVE'
  iv_db_type    = 'VARCHAR(5)'
  iv_label      = 'Expensive Stmt. Trace Exists'
  iv_expression= 'CASE WHEN IFNULL (T2.STATEMENT_HASH, "NULL") != "NULL"
               THEN "TRUE" ELSE "FALSE" END'
  iv_dependencies = 'T2.STATEMENT_HASH' ).

lo_rds_join->use_field(
  iv_id = 'TOTAL_EXECUTION_TIME'
  iv_alias = 'T1' ).

EXPLICIT DECLARATION OF ASSOCIATIONS TO OPTIMIZE GROUPING OF ELEMENTS BY LARGE DATA OBJECTS

CROSS-REFERENCE TO RELATED APPLICATIONS

An earlier patent application that is related to this disclosure is the patent application entitled DEEP FILTER PROPAGATION USING EXPLICIT DEPENDENCY AND EQUIVALENCY DECLARATIONS IN A DATA MODEL, filed as U.S. patent application Ser. No. 15/086,733, filed on Mar. 31, 2016, the entire contents of which are hereby incorporated by reference.

BACKGROUND

The present disclosure relates to the generation of queries used to obtain results from databases.

Systems and databases can handle requests for data, such as database queries. For example, a query that is entered by a user, or a query that is formulated based on user inputs or based on other inputs, can be generated and run against a relational database, such as using a relational database management system (RDBMS). In some cases, queries can be formulated at runtime. Depending on the inputs on which the queries are based, the queries can be very complex. For example, a complex query can result from information associated with end user input such as large objects (LOBs). In some cases, queries can contain, for example, complex combinations of unions and joins of multiple database tables or stacked combinations of modeled data sources that potentially make a query complex. Regardless of the complexity of a query, an end user may expect a result and a prompt response from an associated system that handles the query.

SUMMARY

This disclosure generally describes computer-implemented methods, software, and systems for optimizing queries referencing large object (LOB) information. One computer-implemented method includes: identifying a structured query language (SQL) query containing an LOB field; obtaining, from a data model, LOB replacement information for the LOB field; and optimizing the SQL query, including: substituting, using the obtained LOB replacement information, the LOB field with replacement language to create an updated SQL query; and extending the updated SQL query with a join of LOB field language to create an extended SQL query.

The foregoing and other implementations can each optionally include one or more of the following features, alone or in combination. In particular, one implementation can include all the following features:

In a first aspect, combinable with any of the previous aspects, the method further includes executing the extended SQL query in place of the identified SQL query.

In a second aspect, combinable with any of the previous aspects, optimizing the SQL query includes substituting the LOB field with a hash value to produce a valid SQL query.

In a third aspect, combinable with any of the previous aspects, obtaining the replacement information for the LOB field includes accessing the replacement information from a spreadsheet, a database, a JAVASCRIPT Object Notation (JSON) source, or a specific lightweight data-interchange format.

In a fourth aspect, combinable with any of the previous aspects, the data model is stored in a database, stored outside of a database, or created on-the-fly.

In a fifth aspect, combinable with any of the previous aspects, substituting the LOB field with the hash value includes using either a 1:1 mapping of the LOB field to a single replacement field or a 1:n mapping of the LOB field to n multiple replacement fields.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 2A-2C collectively show example SQL statements for a data request natively using LOB-type data for a grouping of data elements.

FIGS. 3A-3D collectively show example valid SQL statements using LOBs.

FIGS. 4A-4D collectively show an example of a data model supporting the LOB replacement.

DETAILED DESCRIPTION

Figure 1:
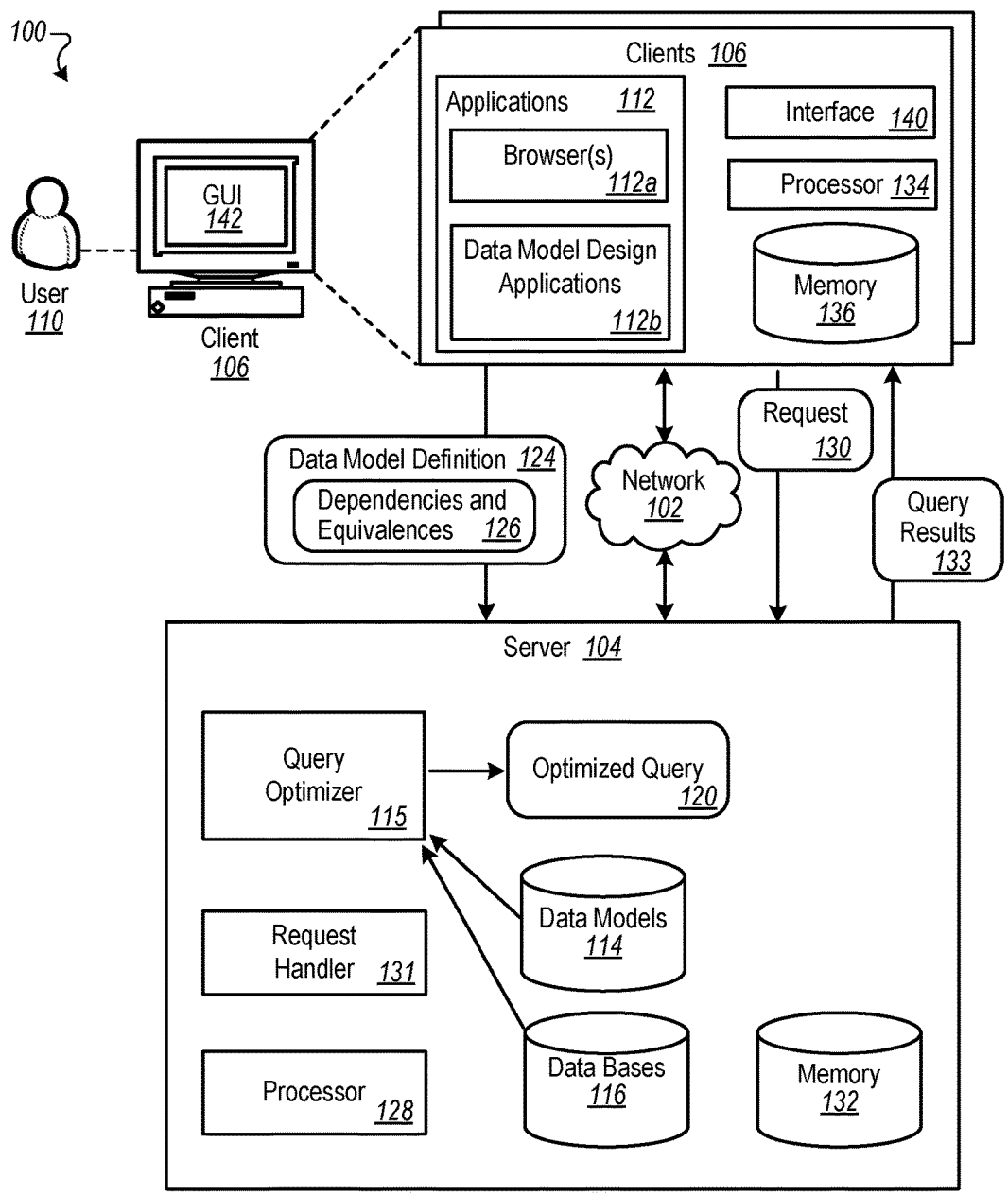
FIG. 1 is a block diagram of an example system for optimizing SQL queries for grouping of elements by large data objects.

This disclosure generally describes computer-implemented methods, software, and systems for optimizing queries referencing large object (LOB) information. A structured query language (SQL) query containing an LOB field is identified. LOB replacement information for the LOB field is obtained. The SQL query is optimized including substituting, using the obtained LOB replacement information, the LOB field with replacement language to create an updated SQL query, and extending the updated SQL query with a join of LOB field language to create an extended SQL query.

An earlier patent application that relates to this disclosure is the patent application entitled "Deep Filter Propagation Using Explicit Dependency and Equivalency Declarations in a Data Model," U.S. patent application Ser. No. 15/086, 733, filed on Mar. 31, 2016, which is hereby incorporated in its entirety. The earlier patent application describes an approach that allows deep filter propagation using declared dependencies and equivalences in a data model. This disclosure extends the idea of declarative optimizations towards the grouping of elements by large data objects in complex data requests, such as SQL queries.

Large objects (LOBs) can be used, for example, to store and process unstructured information such text, binary data (including images and/or sounds), Extensible Markup Language (XML), and/or other data. Large objects can include, for example, one large piece of data that is not further structural, such as a book, a video, a segment of text, a data file, or some other object that is not interpretable by an RDBMS. As such, some devices and some database systems do not allow LOBs to be used in SQL group-by clauses or in other situations.

For these cases, a workaround can be required to enable LOBs to be included within the grouping of elements. Further, even if LOBs are accepted as a data type for grouping, the propagation of LOB data along query processing is quite resource-consuming and can lead to poor response times. However, the described techniques can be used to accelerate the execution of requests that contain group-by clauses based on LOB-type data.

For devices and/or systems that do not allow LOBs for the grouping of aggregates, for example, various workarounds can be used. For example, substituting the actual LOB by a hash value or some other unique identifier can produce a valid SQL query. The resulting substitutions can be reconstituted with the actual LOB after request execution.

In some implementations, associations between LOB-like data and unique identifiers can be declared in a data model in a way that the associations can be used transparently and alternatively at request execution in order to allow and optimize the grouping of data elements.

Various techniques can make use of, for example, an explicit declaration of associations between LOB data types and unique identifiers, such as in part of a data model. These techniques can make it possible to transparently use LOBs or other unique identifiers for the grouping of elements at runtime.

The techniques can be used as an efficient workaround for devices that are not able to deal with LOBs in grouping (e.g., group-by) clauses. In addition, the techniques can lead to optimization of data request processing by avoiding expensive propagation of LOB data throughout the processing chain.

The subject matter described in this specification can be implemented in particular implementations so as to realize one or more of the following advantages. Queries that involve large data objects can be handled more efficiently. A SQL query can be extended with a join using LOB field language to create an extended SQL query that makes the extended SQL query more run-time efficient than the original SQL query.

FIG. 1 is a block diagram of an example environment 100 for optimizing SQL queries for grouping of elements by large data objects. The illustrated environment 100 includes, or is communicably coupled with, at least one server 104 and plural clients 106, all connected using a network 102. The environment 100 can be used, for example, to provide and support applications on the one or more clients 106 using data from databases managed by the server 104 (e.g., a database management system (DBMS)). The applications can include, for example, applications for designing data models and applications for submitting queries (e.g., browsers). Each client 106 comprises an electronic computing device operable to provide information to a user, e.g., using data (e.g., from databases 116) from the server 104, and potentially from other sources, for display on web pages and/or for other uses.

The environment 100 can serve several purposes. For example, a user designing a data model can provide, at design time of a data model (e.g., associated with databases 116), dependencies and equivalences for data elements (e.g., columns in a relational database or expressions on columns in the relational database) in the data model that are received over a computer network. For example, dependencies and equivalences can be included in a code segment that is defined when the data model is designed. The dependencies and equivalences can be stored in persistent storage with the data model, e.g., in a data store of data models 114. In some implementations, the dependencies and equivalences can be stored in a third-party equivalency file or in some other way or location. At a later time, a request, such as a query or other data request, can be received over the computer network. For example, a query can be generated and executed to obtain query results from a database 116 associated with the data model 114. An optimized query, for example, can be generated using the received data query and using the dependencies and equivalences, as well as LOB-related information.

At a high level, the server 104 comprises an electronic computing device operable to store and provide access to data objects for use by the plural clients 106. A data model 114, for example, can be used by (and/or implemented in) a database management system (DBMS) for one or more specific databases 116. In some implementations, there can be plural data models 114, each associated with one or more databases 116. For example, when there are multiple co-operating auto-save caches, one cache can be a master that assumes a coordination/delegation role. In some implementations, the data store of databases 116 can be stored or distributed in plural locations, e.g., at the server 104 and/or other locations.

As used in the present disclosure, the term "computer" is intended to encompass any suitable processing device. For example, although FIG. 1 illustrates a single server 104, the environment 100 can be implemented using two or more servers 104, as well as computers other than servers, including a server pool. Indeed, the server 104 and the clients 106 may be any computer or processing device. In some implementations, the server 104 may be distributed in different locations and coupled using the network 102.

The server 104 includes a processor 128 and memory 132. Although illustrated as the single processor 128 in FIG. 1, two or more processors 128 may be used according to particular needs, desires, or particular implementations of the environment 100. Generally, the processor 128 executes instructions and manipulates data to perform the operations of the server 104. Specifically, the processor 128 executes the functionality required to receive and process requests from the server 104. In some implementations, the memory 132 can store the database 116 and the data model 114.

The memory 132 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 104.

Each client 106 of the environment 100 may be any computing device operable to connect to, or communicate with, other systems via a local DB or via the network 102 using a wire-line or wireless connection. In general, each client 106 comprises an electronic computer device operable to receive, transmit, process, and store any appropriate data associated with the environment 100 of FIG. 1.

The request handler 131, e.g., can handle requests received from the clients 106, e.g., for data to be provided from one or more databases 116, and for user inputs that are to be stored using the data model 114. In some implementations, the database 116 can be implemented using one or more relational databases and/or other storage structures, and the stored data may be stored locally or distributed.

The illustrated client 106 further includes a processor 134, a memory 136, applications 112 (e.g., a browser), and an interface 140. The interface 140 is used by the client 106 for communicating with other systems in a distributed environment—including within the environment 100—connected to the network 102, e.g., other systems communicably coupled to the network 102 (not illustrated). Generally, the interface 140 comprises logic encoded in software and/or hardware in a suitable combination and operable to communicate with the network 102. More specifically, the interface 140 may comprise software supporting one or more communication protocols associated with communications such that the network 102 or interface's hardware is operable to communicate physical signals within and outside of the illustrated environment 100.

Applications 112, including at least one browser 112a and a data model design application 112b) can receive and provide information to the users 110 on each of the respective clients 106. As an example, in order to update a web page displayed in a browser on the client 106, the application 112 can provide a request for data from one or more databases 116 managed by the server 104. An example request 130 entered by the user 110 using the browser 112a can be used to generate query results 133 from the data bases 116. Requests, including requests to store data model definitions, can come from the data model design application 112b, for example, which can receive input from a user who is designing a data model to be stored in persistent storage of the data models 114.

The data model design application 112b can allow the user 110 to design data models, and as such, data model definitions 124 can be provided by the client 106 for storage at the server 104. The data model definitions 124 can include dependencies and equivalences 126, described herein and used, by a query optimizer 118 at the server to create an optimized query 120, an example of which is described with reference to FIGS. 3A-3D. For example, the dependencies and equivalences 126 can include LOB information that is used to extend SQL queries.

As illustrated in FIG. 1, the client 106 includes the processor 134. Although illustrated as the single processor 134 in FIG. 1, two or more processors 134 may be used according to particular needs, desires, or particular implementations of the environment 100. Generally, the processor 134 executes instructions and manipulates data to perform the operations of the client 106. Specifically, the processor 134 executes the functionality required to send requests to the server 104 and to receive and process responses from the server 104.

The illustrated client 106 also includes a memory 136. The memory 136 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client 106.

The illustrated client 106 comprises a graphical user interface (GUI) 142, as shown with respect to and included by the client 106. The GUI 142 interfaces with at least a portion of the environment 100 for any suitable purpose, including user interface screens that display information associated with databases 116, allow queries to submitted, and allow data models to be designed, for example. For example, the user interface screens can provide user entry fields and/or other user entry controls for which a user can provide user inputs, e.g., through the applications 112. User inputs can include, for example, textual input, selections from controls (e.g., menus, lists, options or other elements), navigation commands (e.g., cursor/mouse movements), and/or complex structures (e.g., files, images, sounds, videos). In some implementations, user inputs can be associated with a context, e.g., a particular state or segment of an application.

FIGS. 2A-2C collectively show example SQL statements for a data request natively using LOB-type data for a grouping of data elements. For example, the LOB-type data can be a STATEMENT_STRING.

In this example, LOB-type data can be read at the very beginning of the processing chain, and then the LOB-type data can be propagated up to the final result set (as shown in highlighted statements 202). Because STATEMENT_STRING is of type LOB, it may not be usable for the grouping of rows on some devices. On most databases and database applications, for instance, an SQL error would be returned for the SQL statement.

In some implementations, substituting STATEMENT_STRING (of type LOB) with STATEMENT_HASH (of type VARCHAR) can result in a valid and executable SQL statement. In order to expose STATEMENT_STRING to end users, STATEMENT_STRING can be joined to the result set at the end of the processing chain.

FIGS. 3A-3D collectively show example valid SQL statements 300 using LOBs. In this example, STATEMENT_STRING is used for the grouping of data elements. For example, the first part of the SQL statements 300 (i.e., the final select list) is pretty much the same as the SQL statements 200, except that STATEMENT_STRING is substituted by STATEMENT_HASH (as shown in highlighted statements 302). The STATEMENT_HASH can be used, for example, to group rows in the processing chain. With a join at the end of the SQL statements 300 (as shown in statements 304), STATEMENT_STRING can be reinstated and exposed to end users.

Adding a condition to the artificial column SH_DO_ROW_NUMBER (as shown in highlighted statements 306) can ensure that just one record is received for each selected element of the left part of the join. The individual rows are grouped by STATEMENT_HASH. Further, each of the rows in a group is enumerated, and only the first one is retrieved. For other databases, alternative techniques can be possible.

FIGS. 4A-4D collectively show an example of a data model supporting the LOB replacement. For example, statements 402 of the data model describe an association between STATEMENT_HASH and STATEMENT_STRING. Definitions 404 of the data model can ensure that only the first occurrence of STATEMENT_HAS is retrieved. Definitions 406 of the data model can anchors an association between STATEMENT_HASH and STATEMENT_STRING into an actual data request. In some implementations, definitions 400 can be used for LOB-related information in the data model 114.

The data model above illustrates that STATEMENT_STRING can be substituted by STATEMENT_HASH, showing a 1:1 mapping in our example. The mapping, however, does not need to be 1:1. With our approach, it is also possible to define a mapping of a LOB field to multiple other fields (1:n mapping). In such a case, the processing chain would use multiple fields and would then perform a join with the LOB field at the very end of the request execution. This approach does not limit the number of LOB fields in the group to just one. It can be used for more than one LOB field. Under such circumstances, our approach is even more beneficial in terms of resource consumption and improvement of response times.

Figure 5:
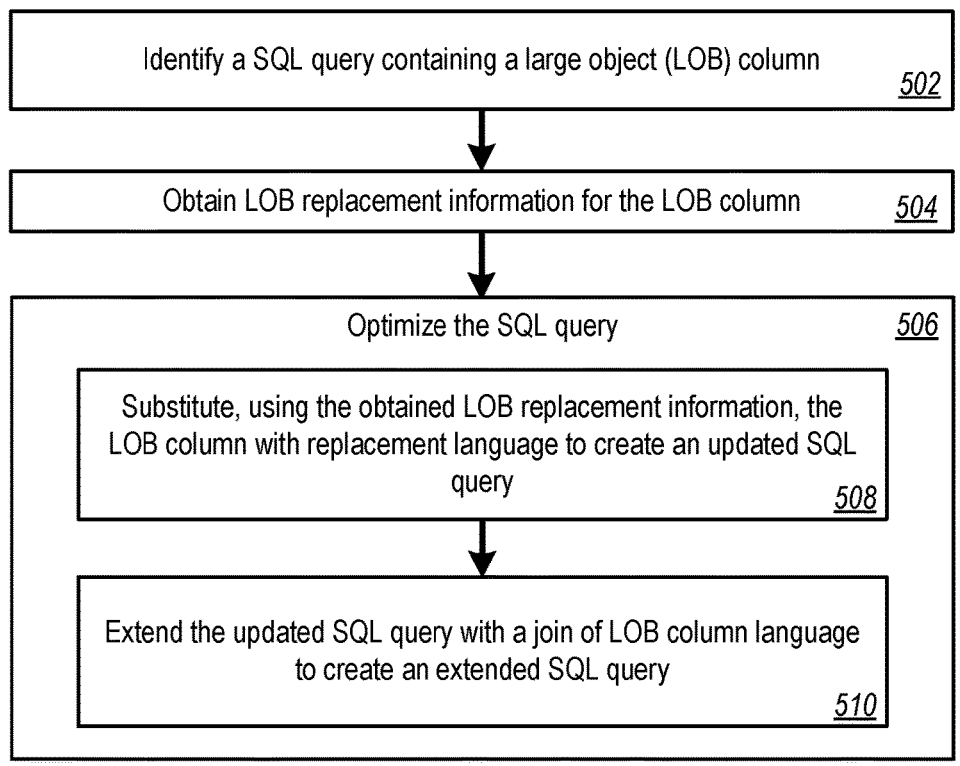
FIG. 5 is a flowchart of an example method 500 for optimizing SQL queries for grouping of elements by large data objects.

FIG. 5 is a flowchart of an example method 500 for optimizing SQL queries for grouping of elements by large data objects. For clarity of presentation, the description that follows generally describes method 500 in the context of FIGS. 1 through 4D.

At 502, a structured query language (SQL) query is identified that contains a large object (LOB) field. For example, the server 104 can receive the SQL statements 200. An LOB field in only one example of a non-groupable data type. Other non-groupable data types, such as binary large objects (BLOBs) and character large objects (CLOBs), can also be handled by the method 500 (and by systems and techniques described herein). In some implementations, data models that support the method 500 can be stored outside the database, stored inside the database, or created on the fly.

At 504, LOB replacement information for the LOB field is obtained from a data model. The server 104, for example, can obtain LOB replacement information for statements 202 that are LOB-related. The LOB replacement information can be obtained, for example, from the data models 114 or from other sources and can depend on information in the dependencies and equivalencies 126.

At 506, the SQL query is optimized. As an example, the query optimizer 120 can optimize the SQL query represented by the SQL statements 200 to create a SQL query represented by the SQL statements 300. In some implementations, optimizing the SQL statement can include operations such as those described in steps 508-510.

At 508, using the obtained LOB replacement information, the LOB field is substituted with replacement language to create an updated SQL query. For example, as described above for the SQL statements 300, the STATEMENT_STRING can be substituted by a STATEMENT_HASH (as shown in highlighted statements 302). In this way, optimizing the SQL query includes substituting LOB field with a hash value to produce a valid SQL query At 510, the updated SQL query is extended with a join of LOB field language to create an extended SQL query. For example, the statements 304 described above include a join at the end of the SQL statements 300, in which STATEMENT_STRING can be reinstated and exposed to end users.

In some implementations, the method 500 further includes executing the extended SQL query in place of the identified SQL query. For example, the server 104 can execute the optimized query 120.

Figure 6:
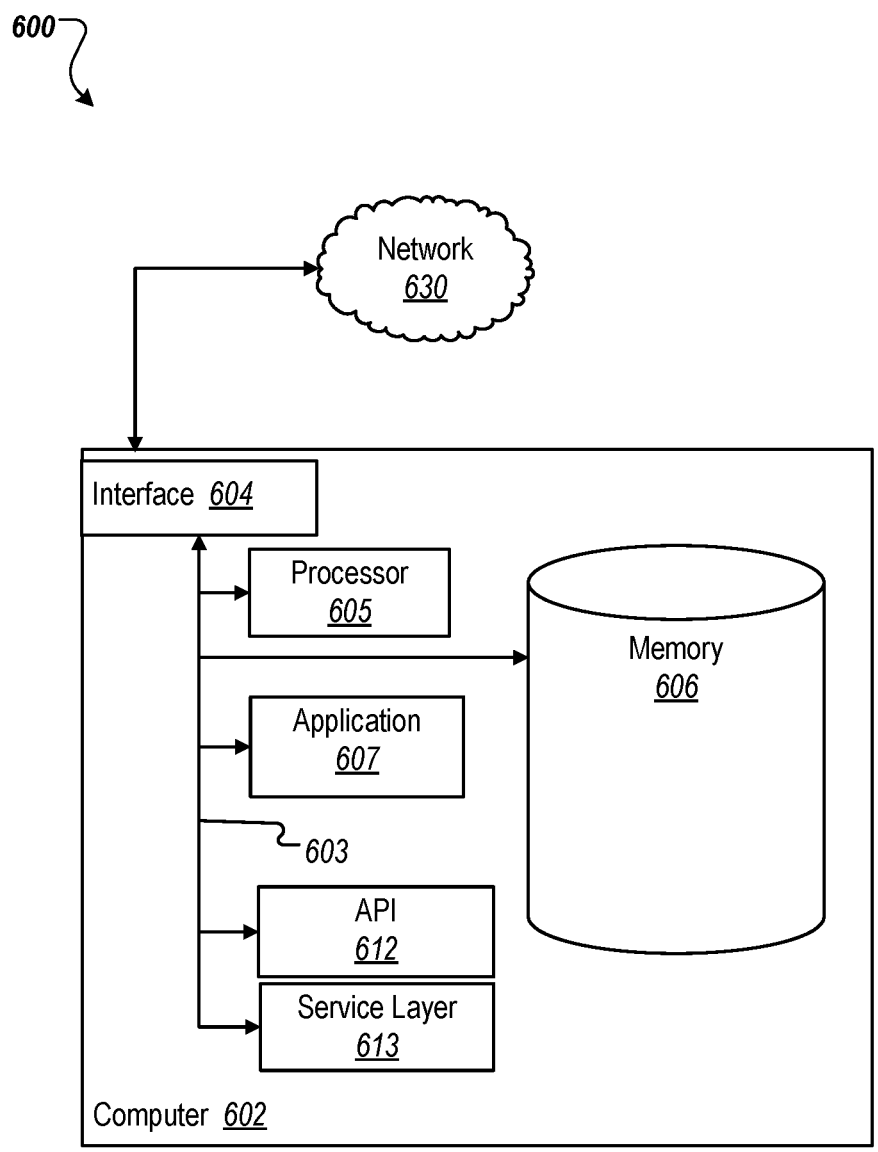
FIG. 6 is a block diagram of an exemplary computer system used to provide computational functionalities associated with described algorithms, methods, functions, processes, flows, and procedures as described in the instant disclosure.

FIG. 6 is a block diagram of an exemplary computer system 600 used to provide computational functionalities associated with described algorithms, methods, functions, processes, flows, and procedures as described in the instant disclosure.

The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a GUI.

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, business intelligence (BI) server, or other server (or a combination of servers).

The computer 602 can receive requests over network 630 from a client application (for example, executing on another computer 602) and responding to the received requests by processing the said requests in an appropriate software application. In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of the instant disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems in a distributed environment that are connected to the network 630 (whether illustrated or not). Generally, the interface 604 comprises logic encoded in software or hardware (or a combination of software and hardware) and operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a memory 606 that holds data for the computer 602 or other components (or a combination of both) that can be connected to the network 630 (whether illustrated or not). For example, memory 606 can be a database storing data consistent with this disclosure. Although illustrated as a single memory 606 in FIG. 6, two or more memories may be used according to particular needs, desires, or particular implementations of the computer 602 and the described functionality. While memory 606 is illustrated as an integral component of the computer 602, in alternative implementations, memory 606 can be external to the computer 602.

The application 607 is an algorithmic software engine providing functionality according to particular needs, desires, or particular implementations of the computer 602, particularly with respect to functionality described in this disclosure. For example, application 607 can serve as one or more components, modules, applications, etc. Further, although illustrated as a single application 607, the application 607 may be implemented as multiple applications 607 on the computer 602. In addition, although illustrated as integral to the computer 602, in alternative implementations, the application 607 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

In some implementations, components of the environments and systems described above may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, components may be adapted to execute any operating system, including Linux, UNIX, Windows, Mac OS®, Java™, Android™, iOS or any other suitable operating system. According to some implementations, components may also include, or be communicably coupled with, an e-mail server, a web server, a caching server, a streaming data server, and/or other suitable server(s).

Processors used in the environments and systems described above may be a central processing unit (CPU), an application specific integrated circuit (ASIC), a field-programmable gate array (FPGA), or another suitable component. Generally, each processor can execute instructions and manipulates data to perform the operations of various components. Specifically, each processor can execute the functionality required to send requests and/or data to components of the environment and to receive data from the components of the environment, such as in communication between the external, intermediary and target devices.

Components, environments and systems described above may include a memory or multiple memories. Memory may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, for references thereto associated with the purposes of the target, intermediary and external devices. Other components within the memory are possible.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. Software may instead include a number of sub-modules, third-party services, components, libraries, and such, as appropriate. Conversely, the features and functionality of various components can be combined into single components as appropriate.

Devices can encompass any computing device such as a smart phone, tablet computing device, PDA, desktop computer, laptop/notebook computer, wireless data port, one or more processors within these devices, or any other suitable processing device. For example, a device may comprise a computer that includes an input device, such as a keypad, touch screen, or other device that can accept user information, and an output device that conveys information associated with components of the environments and systems described above, including digital data, visual information, or a graphical user interface (GUI). The GUI interfaces with at least a portion of the environments and systems described above for any suitable purpose, including generating a visual representation of a web browser.

The preceding figures and accompanying description illustrate example processes and computer implementable techniques. The environments and systems described above (or their software or other components) may contemplate using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, processes may have additional operations, fewer operations, and/or different operations, so long as the methods remain appropriate.

In other words, although this disclosure has been described in terms of certain implementations and generally associated methods, alterations and permutations of these implementations, and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
    identifying a structured query language (SQL) query containing a large object (LOB) field;
    obtaining, from a data model, LOB replacement information for the LOB field; and
    optimizing the SQL query, including:
    substituting, using the obtained LOB replacement information, the LOB field with replacement language to create an updated SQL query;
    extending the updated SQL query with a join of LOB field language to create an extended SQL query; and
    substituting the LOB field with a hash value to produce a valid SOL query.

2. The computer-implemented method of claim 1, further comprising executing the extended SQL query in place of the identified SQL query.

3. The computer-implemented method of claim 1, wherein obtaining the replacement information for the LOB field includes accessing the replacement information from a spreadsheet, a database, a JAVASCRIPT Object Notation (JSON) source, or a specific lightweight data-interchange format.

4. The computer-implemented method of claim 1, wherein the data model is stored in a database, stored outside of a database, or created on-the-fly.

5. The computer-implemented method of claim 1, wherein substituting the LOB field with the hash value includes using either a 1:1 mapping of the LOB field to a single replacement field or a 1:n mapping of the LOB field to n multiple replacement fields.

6. A system comprising:
    memory storing a data model for handling large data objects in queries; and a server performing operations comprising:
    identifying a structured query language (SQL) query containing an ungroupable data type field;
    obtaining, from a data model, replacement information for the ungroupable data type field; and
    optimizing the SQL query, including:
    substituting, using the obtained replacement information, the ungroupable data type field with replacement language to create an updated SQL query;
    extending the updated SQL query with a join of ungroupable data type field language to create an extended SQL query; and
    substituting the ungroupable data type field with a hash value to produce a valid SOL query.

7. The system of claim 6, the operations further comprising executing the extended SQL query in place of the identified SQL query.

8. The system of claim 6, wherein the ungroupable data type is a large object (LOB), a binary large object (BLOB), or a character large object (CLOB).

9. The system of claim 6, wherein obtaining the replacement information for the ungroupable data type field includes accessing the replacement information from a spreadsheet, a database, a JAVASCRIPT Object Notation (JSON) source, or a specific lightweight data-interchange format.

10. The system of claim 6, wherein the data model is stored in a database, stored outside of a database, or created on-the-fly.

11. The system of claim 6, wherein substituting the ungroupable data type field with the hash value includes using either a 1:1 mapping of the ungroupable data type field to a single replacement field or a 1:n mapping of the ungroupable data type field to n multiple replacement fields.

12. A non-transitory computer-readable media encoded with a computer program, the program comprising instructions that when executed by one or more computers cause the one or more computers to perform operations comprising:
    identifying a structured query language (SQL) query containing an ungroupable data type field;
    obtaining, from a data model, replacement information for the ungroupable data type field; and
    optimizing the SQL query, including:
    substituting, using the obtained replacement information, the ungroupable data type field with replacement language to create an updated SQL query;
    extending the updated SQL query with a join of ungroupable data type field language to create an extended SQL query; and
    substituting the ungroupable data type field with a hash value to produce a valid SOL query.

13. The non-transitory computer-readable media of claim 12, the operations further comprising executing the extended SQL query in place of the identified SQL query.

14. The non-transitory computer-readable media of claim 12, wherein the ungroupable data type is a large object (LOB), a binary large object (BLOB), or a character large object (CLOB).

15. The non-transitory computer-readable media of claim 12, wherein obtaining the replacement information for the ungroupable data type field includes accessing the replacement information from a spreadsheet, a database, a JAVASCRIPT Object Notation (JSON) source, or a specific lightweight data-interchange format.

16. The non-transitory computer-readable media of claim 12, wherein the data model is stored in a database, stored outside of a database, or created on-the-fly.

17. The non-transitory computer-readable media of claim 12, wherein substituting the ungroupable data type field with the hash value includes using either a 1:1 mapping of the ungroupable data type field to a single replacement field or a 1:n mapping of the ungroupable data type field to n multiple replacement fields.

* * * * *